No. 781,401. PATENTED JAN. 31, 1905.
J. M. CHAPPELL.
ADDING DEVICE.
APPLICATION FILED FEB. 9, 1904.
2 SHEETS—SHEET 1.
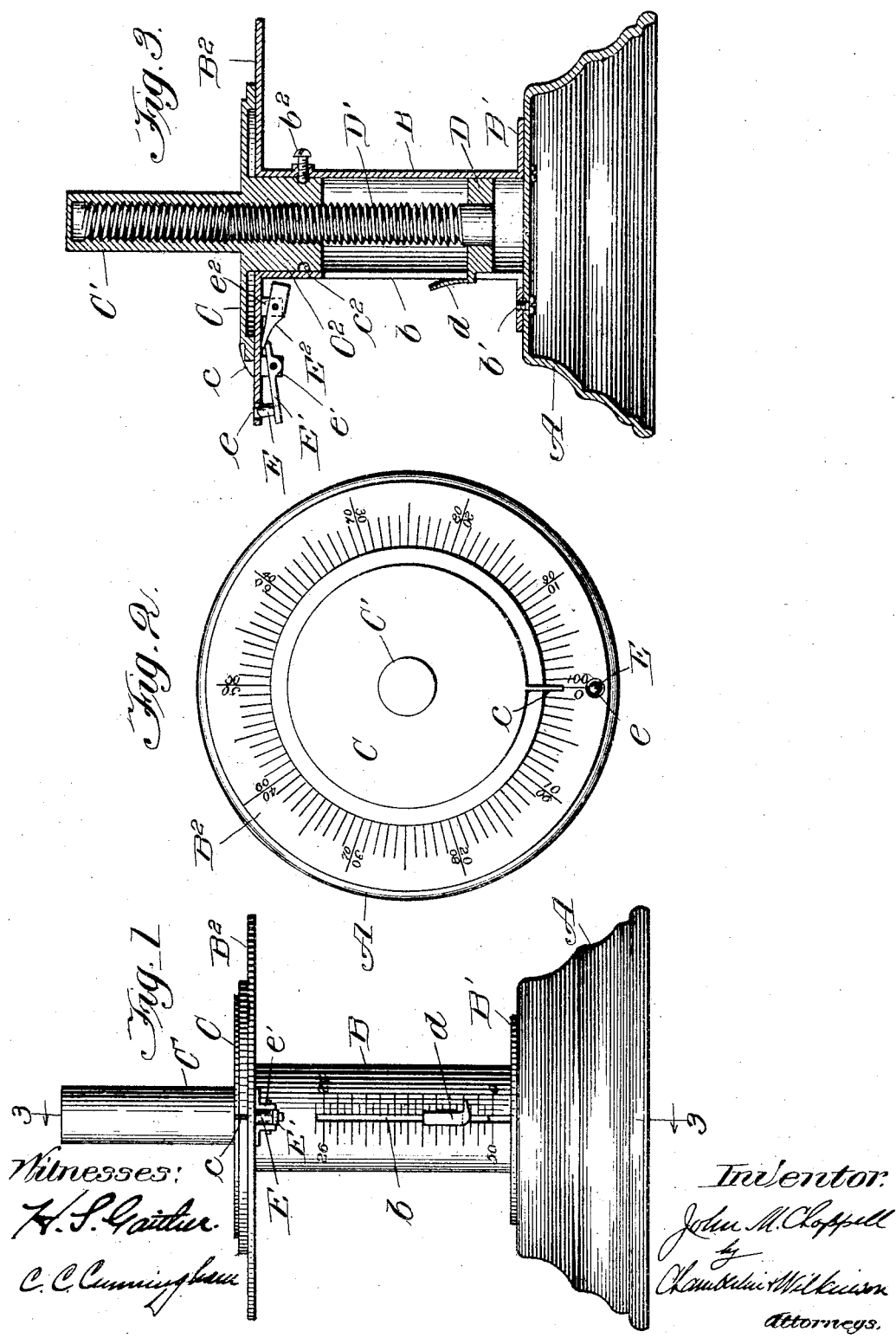

No. 781,401. PATENTED JAN. 31, 1905.
J. M. CHAPPELL.
ADDING DEVICE.
APPLICATION FILED FEB. 9, 1904.
2 SHEETS—SHEET 2.
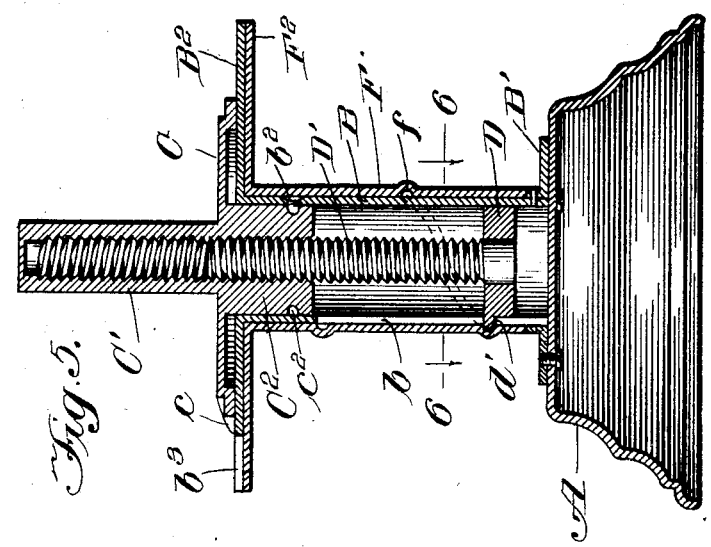
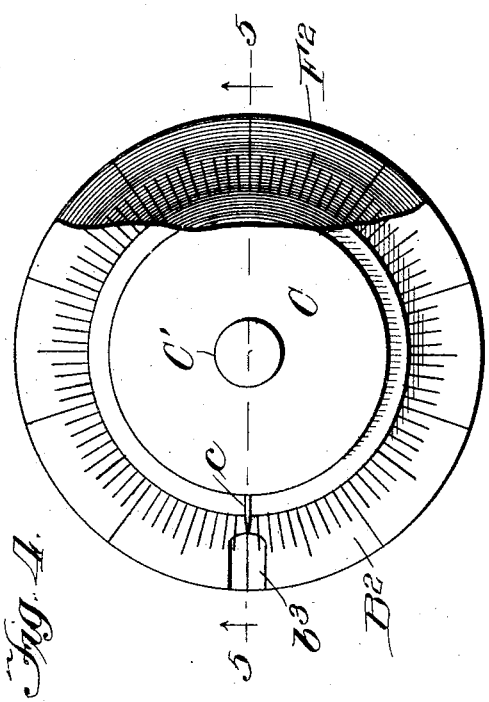
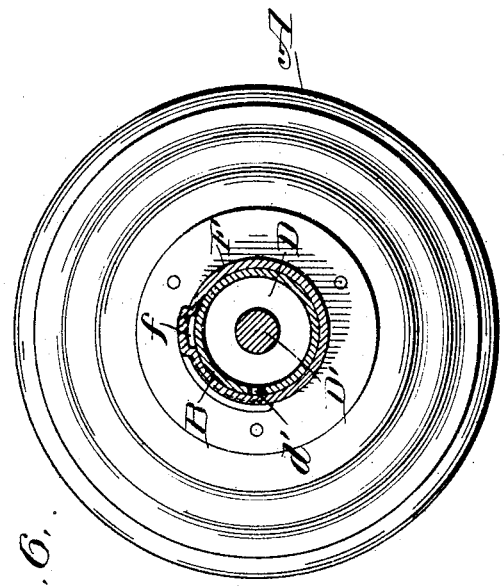
Witnesses:
H. S. Gaither
C. C. Cunningham
Inventor:
John M. Chappell
by Lamberlen Wilkinson
Attorneys No. 781,401. Patented January 31, 1905.

UNITED STATES PATENT OFFICE.

JOHN M. CHAPPELL, OF CHICAGO, ILLINOIS.

ADDING DEVICE.

SPECIFICATION forming part of Letters Patent No. 781,401, dated January 31, 1905.

Application filed February 9, 1904. Serial No. 192,824.

*To all whom it may concern:*

Be it known that I, JOHN M. CHAPPELL, a citizen of the United States, residing at Chicago, county of Cook, State of Illinois, have invented a certain new and useful Improvement in Adding Devices; and I declare the following to be a full, clear, and exact description of the invention, such as will enable others skilled in the art to which it pertains to make and use the same, reference being had to the accompanying drawings, which form a part of this specification.

My invention relates in general to mechanical registering devices, and more particularly to a device for indicating the total amount of a series of individual successively-registered amounts.

It is frequently convenient to have at hand for reference a record of the total of a plurality of separate amounts—such, for instance, as the total amount of money expended for a plurality of purchases. To keep such a record by notation requires that each successive amount be noted and added to the total of the preceding amounts.

The primary object of my invention is to provide a mechanical device upon which may be successively registered individual amounts and which will at all times indicate the total of the individual registered amounts.

A further object of my invention is to provide an adding device which will be simple in construction, inexpensive in manufacture, and convenient in use.

My invention, generally described, consists in a dial, a pointer movable relatively to said dial, a scale and relatively movable coöperating indicating device, and means actuated by said pointer whereby the revolutions of the pointer around the dial are registered on the scale by the relative movement between the scale and its coöperating indicating device.

My invention will be more fully described hereinafter with reference to the accompanying drawings, in which the same is illustrated as embodied in two convenient and practical forms, and in which—

Figure 1 is a side elevational view; Fig. 2, a plan view; Fig. 3, a vertical sectional view on line 3 3, Fig. 1; Fig. 4, a plan view of a modification; Fig. 5, a central sectional view on line 5 5, Fig. 4; and Fig. 6, a sectional plan view on line 6 6, Fig. 5.

Similar reference characters are used to designate similar parts in the several figures of the drawings.

Referring more particularly to Figs. 1, 2, and 3, reference character A designates a base of any suitable size and shape which, for convenience, is shown as consisting in an inverted metal cup. B designates a tube mounted upon the base in any convenient manner—such, for instance, as by means of screws $b'$, extending through the top of the base and engaging a laterally-projecting flange $B'$, surrounding the bottom of the tube. $B^2$ designates a dial projecting horizontally from the upper end of the tube and provided with graduations on its upper surface, as indicated in Fig. 2. C designates a disk located concentrically above the dial $B^2$ and having a radially-projecting pointer $c$, which extends over the graduations on the dial. $C^2$ indicates a semicircular nut projecting concentrically below the disk C and fitting within the upper end of the tube B. The screw-threaded opening in the nut is preferably extended upwardly into a post $C'$, projecting above the disk C. A groove $c^2$ is provided in the outer surface of the nut, near the lower end thereof, into which extends a set-screw $b^2$, adjustably mounted in the tube B. $D'$ designates a screw-threaded rod located concentrically in the tube B and engaging the screw-threaded opening in the nut C and post $C'$. Fixed to the lower end of the rod $D'$ is a collar D, from which projects a pointer $d$, the latter extending through a vertical slot $b$, formed in the tube B. A pin E is adapted to be projected upwardly through an opening $e$, formed through the dial $B^2$ near the periphery thereof. The pin E is mounted upon the outer end of a short lever $E'$, pivoted between ears $e'$, supported beneath the dial $B^2$. A second lever $E^2$ is pivotally supported between ears $e^2$, depending from the under surface of the dial. The outer end of the lever $E^2$ extends above the inner end of the lever $E'$, while the inner end of the lever $E^2$ is located in the path of movement of the pointer $d$.

The operation of the embodiment of my invention above described is as follows: When it is desired to register an amount, the disk $C^2$ is rotated by grasping the post $C'$ and the pointer $c$ thereby moved with respect to the graduations on the dial a distance corresponding to the desired amount to be registered. Subsequent amounts are registered by continuing the rotation of the pointer $c$ with respect to the dial. The rotation of the disk $C$ through the screw-threaded engagement between the nut and post carried thereby and the rod $D'$ moves the latter upwardly a distance corresponding to the pitch of the screw-threads. The number of rotations of the pointer $c$ with respect to the dial is therefore indicated by the position of the indicating device $d$ with respect to the scale marked on the exterior of the tube $B$ adjacent to the slot $b$ therethrough. The pitch of the screw-threaded rod $D'$ is preferably such that each revolution of the pointer $c$ elevates the indicating device $d$ the distance between the graduations on the tube indicated in Fig. 1. When the limit of the upward movement of the rod $D'$ has been reached, the indicating device $d$ engages the inner end of the lever $E^2$ and rocks the same, so that the lever $E'$ will be oscillated and the pin $E$, carried thereby, projected upwardly through the opening $e$ in the dial, indicating the fact that the disk $C$ can be rotated no further. If desired, the registering capacity of the device may be doubled by numbering the graduations on the dial in both directions, as shown in Fig. 2, and numbering the graduations at one side of the slot $b$ progressively upwardly and at the other side of the slot progressively downwardly, so that when the limit of rotation of the disk in one direction has been reached it may be rotated in an opposite direction and the total rotations indicated by the position of the device $d$ with respect to the coöperating scale.

In Figs. 4, 5, and 6 I have illustrated a modified embodiment of my invention, in which the number of revolutions of the pointer $c$ with respect to the dial $B^2$ is so registered as to be visible through the dial. In such modification of my invention the base $A$, tube $B$, disk $C$, screw-threaded rod $D'$, and collar $D$ thereon are the same in construction and operation as above described in connection with Figs. 1, 2, and 3. In lieu of the indicating device $d$ and coöperating scale marked on the tube $B$ at either side of the slot $b$ a sleeve $F$ is placed around the tube $B$, at the upper end of which a disk $F^2$ is carried. The disk $F^2$ may conveniently conform in diameter to the dial $B^2$, and is preferably located immediately under the same. An opening $b^3$ is provided in the periphery of the dial, through which the graduations on the disk $F^2$ may be read. The interior of the sleeve $F$ is provided with a spiral groove $f$, into which extends a projection $d'$, carried by the collar $D$, and which passes through the slot $b$ in the tube $B$.

The operation of the embodiment of my invention illustrated in Figs. 4, 5, and 6 is as follows: The disk $C$ is rotated with respect to the dial $B^2$ so that the pointer $c$ will indicate the desired amount on the dial in the same manner as described in connection with Figs. 1, 2, and 3. As the collar $D$ is carried upwardly by the rod $D'$ the sleeve $F$ is rotated through the engagement of the projection $d'$ with the spiral groove $f$, so that the rotations of the pointer $c$ with respect to the dial will be indicated by the movement of the disk $F^2$ beneath the opening $b^3$ in the dial. The pitch of the groove $f$ is such that each revolution of the pointer $c$ with respect to the dial rotates the disk $F^2$ the distance between the graduating-marks thereon. The limit of the upward movement of the rod $D'$ may be indicated by a characteristic mark on the disk $F^2$, which will be exposed through the opening $b^3$ in the dial when the limit is reached.

From the foregoing description it will be observed that I have invented an improved registering device by means of which the total of a plurality of successively-registered amounts is at all times indicated, so that a number of individual amounts may be added together by separately registering the same on the device.

While I have described more or less precisely the details of construction, I do not wish to be understood as limiting myself thereto, as I contemplate changes in form, the proportion of parts, and the substitution of equivalents as circumstances may suggest or render expedient without departing from the spirit of my invention.

Having now fully described my invention, what I claim as new, and desire to secure by Letters Patent, is—

1. In an adding device, the combination with a dial, of a vertical tube upon which said dial is rigidly mounted, a disk rotatively mounted on said dial, a pointer on said disk extending over the graduations of the dial, a nut secured to said disk located within the upper end of said tube, a screw-threaded rod engaging said nut and located concentrically within said tube, a scale, an indicating device movable relatively to said scale, and mechanism actuated by said screw-threaded rod for relatively moving said scale and coöperating indicating device.

2. In an adding device, the combination with a dial, of a vertical tube upon which said dial is rigidly mounted, a disk rotatively mounted on said dial, a pointer on said disk extending over the graduations of the dial, a nut secured to said disk located within the upper end of said tube, a screw-threaded rod engaging said nut and located concentrically within said tube, a collar fitting within said tube and rigidly secured to the lower end of said rod, a scale, an indicating device, and means actuated by said collar for relatively moving said scale and indicating device.

3. In an adding device, the combination with a dial, of a vertical tube upon which said dial is rigidly mounted, said tube having a vertical slot therethrough with graduations thereon, a pointer movable relatively to said dial, an indicating device extending through the slot of said tube, and mechanism actuated by said pointer for elevating said indicating device and thereby registering the rotations of the pointer with respect to its dial on said scale.

4. In an adding device, the combination with a dial, of a vertical tube to which said dial is secured, said tube having a vertical slot therethrough with graduations thereon, a pointer movable relatively to said dial, a nut rigidly secured to said pointer and located within the upper end of said tube, a screw-threaded rod in engagement with said nut and located concentrically within said tube, a collar secured to the lower end of said rod, an indicating device carried by said collar and extending through the slot in said tube whereby the position of said collar and consequently the number of rotations of the pointer with respect to its dial are registered on said graduations.

5. In an adding device, the combination with a dial, of a vertical tube upon which said dial is mounted, a disk rotatively mounted on said dial, a pointer on said disk extending over the graduations of the dial, a post projecting concentrically above said disk by means of which it is rotated, a nut secured to the under side of said disk and located within the upper end of said tube, the screw-threaded opening in said nut being continued upwardly within said post, a rod in screw-threaded engagement with said nut, a scale, an indicating device movable relatively to said scale, and means actuated by said rod for relatively moving said scale and indicating device.

6. In an adding device, the combination with a dial, of a tube at the upper end of which said dial is mounted, a pointer movable relatively to said dial, a nut connected to said pointer and located within the upper end of said tube, a screw-threaded rod in engagement with said nut, a scale, an indicating device movable relatively to said scale, and visual means for automatically indicating the limit of the relative movement between said indicating device and scale.

7. In an adding device, the combination with a dial, of a pointer movable relatively to said dial, a vertical tube on the upper end of which said dial is mounted, a nut carried by said pointer and rotatively located within the upper end of said tube, a screw-threaded rod in engagement with said nut, a collar secured to the lower end of said rod, a pointer extending through a vertical slot in said tube and carried by said collar, a lever pivoted to the under side of said dial, a pin carried by said lever and adapted to be elevated through a hole in said dial, and means for oscillating said lever to project said pin above the face of the dial actuated by the pointer carried by said collar when the latter reaches the limit of its upward movement.

In testimony whereof I sign this specification in the presence of two witnesses.

JOHN M. CHAPPELL.

Witnesses:
GEO. L. WILKERSON,
C. C. CUNNINGHAM.